United States Patent
Rindtorff et al.

(10) Patent No.: US 12,174,811 B2
(45) Date of Patent: Dec. 24, 2024

(54) ADAPTIVE MESSAGE RETENTION TIME BASED ON USER INTERACTION

(71) Applicant: International Business Machines Corporation, Armonk, NY (US)

(72) Inventors: Klaus Rindtorff, Weil im Schoenbuch (DE); Subhi al Hasan, Hamburg (DE); Tareq Al-Maamari, Holzgerlingen (DE); Heinz Peter Hippenstiel, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/809,072

(22) Filed: Jun. 27, 2022

(65) Prior Publication Data
US 2023/0418795 A1    Dec. 28, 2023

(51) Int. Cl.
*G06F 16/22*     (2019.01)
*G06F 16/23*     (2019.01)
*G06F 16/2455*   (2019.01)

(52) U.S. Cl.
CPC ...... *G06F 16/2219* (2019.01); *G06F 16/2365* (2019.01); *G06F 16/2455* (2019.01)

(58) Field of Classification Search
CPC ............. G06F 16/2219; G06F 16/2455; G06F 16/2365
USPC ....................................................... 707/662
See application file for complete search history.

(56) References Cited

U.S. PATENT DOCUMENTS

| | | | |
|---|---|---|---|
| 7,249,251 B2 | 7/2007 | Todd | |
| 7,644,072 B2 * | 1/2010 | Budzik | G06F 16/951<br>715/204 |
| 8,209,567 B2 * | 6/2012 | Cohen | G06F 16/285<br>714/39 |
| 8,700,576 B2 * | 4/2014 | Stakutis | G06F 16/125<br>707/662 |
| 8,825,513 B1 * | 9/2014 | Misra | G06Q 30/02<br>705/7.31 |

(Continued)

OTHER PUBLICATIONS

"Analyzing Interactions in a Slack Communication Network", by Memgraph, Oct. 1, 2021, 11 pages, <https://memgraph.com/blog/slack-influence-bot>.

(Continued)

*Primary Examiner* — Hanh B Thai
(74) *Attorney, Agent, or Firm* — Yee & Associates, P.C.

(57) ABSTRACT

Embodiments of the present invention provide computer-implemented methods, computer program products, and computer systems. Specifically, embodiments of the present invention can dynamically adjust individual message retention times in a messaging system is disclosed. Embodiments of the present invention can then receive a plurality of messages, store the plurality of messages in a storage system, determine continuously, by the messaging system, interactions with messages stored by the messaging system, and determine dynamically, by the messaging system, a retention score value for selected messages based on a sum of weighted interactions type count values of the determined interactions. Finally, embodiments of the present invention can delete by the messaging system, messages for which the retention score value is below a predetermined retention threshold value.

19 Claims, 6 Drawing Sheets

(56) References Cited

U.S. PATENT DOCUMENTS

| | | | |
|---|---|---|---|
| 8,868,590 B1* | 10/2014 | Donneau-Golencer | G06F 16/24578 707/765 |
| 10,133,812 B2* | 11/2018 | Lee | G06F 16/335 |
| 10,210,218 B2* | 2/2019 | Crosby | G06F 16/332 |
| 10,867,269 B2* | 12/2020 | Grady Smith | G06Q 10/067 |
| 10,880,237 B2* | 12/2020 | Anger | G06F 16/9535 |
| 10,911,387 B1* | 2/2021 | Al Majid | H04L 51/043 |
| 10,964,222 B2* | 3/2021 | Laverty | G09B 9/00 |
| 11,003,720 B1* | 5/2021 | Xia | G06F 16/383 |
| 11,296,971 B1* | 4/2022 | Jain | H04L 43/08 |
| 11,328,026 B2* | 5/2022 | Nguyen | G06Q 50/01 |
| 11,521,714 B1* | 12/2022 | Jain | G16H 10/60 |
| 11,636,116 B2* | 4/2023 | Kulkarni | G06F 16/2428 707/741 |
| 11,636,500 B1* | 4/2023 | Jain | G06Q 30/0203 705/7.32 |
| 11,899,622 B2* | 2/2024 | Sadiq | G06F 16/16 |
| 2007/0100950 A1* | 5/2007 | Bornstein | G06Q 10/107 709/206 |
| 2008/0168146 A1* | 7/2008 | Fletcher | H04L 51/56 709/206 |
| 2009/0292583 A1* | 11/2009 | Eilam | G06Q 40/02 705/7.31 |
| 2010/0131470 A1 | 5/2010 | Schmidt | |
| 2010/0293170 A1* | 11/2010 | Hall | G06F 16/353 707/750 |
| 2011/0313835 A1* | 12/2011 | Falkenborg | G06Q 30/0224 705/30 |
| 2013/0218896 A1* | 8/2013 | Palay | G06F 16/31 707/E17.014 |
| 2013/0218897 A1* | 8/2013 | Palay | G06F 16/3344 707/741 |
| 2013/0218921 A1* | 8/2013 | Palay | G06F 16/22 707/769 |
| 2013/0262438 A1* | 10/2013 | Palay | G06F 16/3344 707/E17.014 |
| 2013/0297623 A1* | 11/2013 | Niyogi | G06F 16/24578 707/751 |
| 2014/0089280 A1* | 3/2014 | Palay | G06F 16/31 707/696 |
| 2014/0095641 A1 | 4/2014 | Consul | |
| 2015/0046435 A1* | 2/2015 | Donneau-Golencer | G06F 16/9032 707/766 |
| 2015/0195406 A1* | 7/2015 | Dwyer | G10L 15/02 379/265.07 |
| 2015/0310100 A1* | 10/2015 | Bursey | G06F 16/951 707/706 |
| 2016/0034466 A1* | 2/2016 | Sinha | G06F 16/9535 707/732 |
| 2016/0171540 A1* | 6/2016 | Mangipudi | G06Q 30/0255 705/14.53 |
| 2016/0344828 A1* | 11/2016 | Häusler | H04L 67/1044 |
| 2017/0006135 A1* | 1/2017 | Siebel | H04L 69/40 |
| 2017/0236081 A1* | 8/2017 | Grady Smith | G06Q 10/0637 705/7.36 |
| 2017/0374147 A1* | 12/2017 | McNair | H04L 41/0896 |
| 2018/0130022 A1 | 5/2018 | Ayoub | |
| 2018/0150524 A1* | 5/2018 | Anger | G06F 16/9535 |
| 2018/0198863 A1* | 7/2018 | Davis | H04L 67/1097 |
| 2020/0202317 A1* | 6/2020 | Cassel | G06Q 30/00 |
| 2022/0318828 A1* | 10/2022 | Hsu | H04N 21/44222 |
| 2022/0382713 A1* | 12/2022 | Sadiq | G06F 16/27 |
| 2023/0298312 A1* | 9/2023 | Saraee | G06N 3/045 382/157 |

OTHER PUBLICATIONS

"Automatically apply a retention label to retain or delete content", Feb. 4, 2022, 17 pages, <https://docs.microsoft.com/en-us/microsoft-365/compliance/apply-retention-labels-automatically?view-o365-worldwide>.

"Edit message retention settings for specific conversations", Downloaded Feb. 7, 2022, 3 pages, <https://slack.com/intl/en-in/help/articles/115005393586-Edit-message-retention-settings-for-specific-conversations>.

"Retain Gmail messages with Vault", Downloaded Feb. 7, 2022, 3 pages, <https://support.google.com/vault/answer/2535539?hl=en#zippy=%2Cwhat-data-can-be-retained%2Cwhen-gmail-messages-are-purged>.

Mell et al., "The NIST Definition of Cloud Computing", Recommendations of the National Institute of Standards and Technology, NIST Special Publication 800-145, Sep. 2011, 7 pages.

* cited by examiner

ADAPTIVE MESSAGE RETENTION TIME BASED ON USER INTERACTION

BACKGROUND

The present invention relates in general to message management systems and in particular to dynamically adjusting individual message retention times in message management systems.

In times of proliferation of continuously generated digital data, intelligent storage management ranks high on the priority list of IT (information technology) departments. Messaging systems are flooded with all kinds of messages, including email messages, instant messages, messages from IoT (Internet of Things) devices, monitoring systems, chat systems and more. Often, such messages are only important, or only have a short-term meaning, but no future value. However, also in such volatile environments, some messages are worthwhile to keep for future reference. They may also be likely to be retrieved after longer period of time, such as references to general information or messages that contain an inherent value.

However, in all known techniques, messaging systems typically retain messages regardless of their content. The messaging systems may also delete some of the messages, after a predefined period of time according to preset conditions. The disadvantage of such message storage management may be that messages which may have a longer-term value may also be deleted. Furthermore, the value of selected messages may vary over time, i.e., the value shortly after the creation and storage may be comparably high and may decrease rapidly in a second period of time. However, after another triggering event, the value of the message may increase again which may be reflected in the fact that the topic may be discussed again among the participants or subscribers of the messaging network.

Existing solutions describe techniques to manage retention policy tags for messages. To implement this, a tagging component is operative to take a message with an exploration tech to form an exploration, wherein the exploration tags have exploration information used to expire the exploration tagged message in accordance with the retention policy.

Another existing solution that manages electronic communication accesses and selects from processing according to one or more message disposition schemes. Such schemes are configured to cause deletion, archiving, updating, tagging and source association. Furthermore, an expiry processing may be initiated by the receiver or the sender.

However, each of these solutions lack mechanisms for a dynamic management of the expiration time, that is, there remain requirements for more dynamic management of the expiration time and subsequent deletion of messages depending on variables other than predefined schemes and rules.

SUMMARY

According to one aspect of the present invention, a method for dynamically adjusting individual message retention times in a messaging system may be provided. The method may comprise receiving, by the messaging system, a plurality of messages, storing, by the messaging system, the plurality of messages in a storage or storage system, and determining continuously, by the messaging system, interactions with messages stored by the messaging system.

Furthermore, the method may comprise determining dynamically, by the messaging system, a retention score value for selected messages based on a sum of weighted interactions type count values of the determined interactions, and deleting, by the messaging system, messages for which the retention score value is below a predetermined retention threshold value.

According to another aspect of the present invention, an adaptive message retention system for dynamically adjusting individual message retention times in a messaging system may be provided. The system may comprise a processor and a memory, communicatively coupled to said processor, wherein said memory stores program code portions that, when executed, enable the processor to receive a plurality of messages, to store the plurality of messages in a storage, and to determine continuously, by the messaging system, interactions with messages stored by the messaging system.

Additionally, the processor may be enabled to determine dynamically a retention score value for selected messages based on a sum of weighted interactions type count values of the determined interactions and delete messages for which the retention score value is below a predetermined retention threshold value.

The proposed method for dynamically adjusting individual message retention times in a messaging system may offer multiple advantages, technical effects, contributions and/or improvements: dynamic retention times can use fixed or relative threshold values based on retention scores of examined messages in a messaging system; does not rely on fixed retention times or preset schemas and/or rules, etc. Additionally, the dynamic retention of messages results in an overall reduction of storage resources.

Based on the concept of dynamic retentions times for individual messages the just mentioned predetermined threshold value may be a fixed value, or a relative value derived from the retention scores of all examined messages in the messaging system.

In contrast to known technologies, the concept proposed here does not rely on fixed retention times and schemas or rules, but dynamically manages a continuous and adaptive storage or deletion of messages in the messaging system. Specifically, embodiments of the present invention dynamically generate a retention score value at regular intervals. Other embodiments of the present invention can provide adaptive storage based on dynamic triggers to assess when a message should be deleted.

One of the advantageous features of the concept proposed here may be in the fact that the method as well as the related system may support a dynamic assessment scheme according to which the messages are assessed in respect to interactions that may happen to the messages. Such interactions may comprise a wide variety of different types of interactions with a certain message. For example, the assessment may happen at a regular time interval, or on demand if storage resource limitations require it.

In general, if there are no interactions over a certain period of time, the retention score value may be relatively low—particularly, below a retention threshold value—and therefore may be discarded. Other messages—even if they may be much older—may have a much higher retention score value because interactions happened to this message because there was some interaction with the content of the message. In this case, the message may not be deleted. In this sense, the proposed concept is self-learning, self-adjusting and self-optimized.

Experiments show that using this inventive concept, large amounts of storage may be saved in messaging systems and only those messages with an inherent value may be stored over a longer period of time. Because of its dynamic assessment method, the underlying system may adapt itself continuously to varying requirements and information needs of the user. A further application of this technique may be in message broker environment. Also here, store-and-forward techniques may be applied. Hence, the concept may also be used here in an advantageous manner.

Another advantageous effect of the proposed concept it that messages in the system can be found faster because fewer messages are stored. Hence, the inventive concept allows a better usage of existing resource.

In the following, additional embodiments of the inventive concept—applicable for the method as well as for the system—will be described.

According to a permissive embodiment, the method may further comprise maintaining, by the messaging system, a list of search terms used in the messaging system, and determining—in particular regularly or on demand—by the messaging system, whether one or more search terms of the list of search terms may be found in a stored message. Thereby, a search score value for the message may be built. Furthermore, the determining of the retention score value may also be based on the search score value.

It should also be noted that the terms in the list of search terms may only be kept for a predefined time so that search terms that are older than a predefined time may no longer be on the list. Another criterion to delete search terms from the list may be a limitation of a maximum length of the list of search terms. In this case, the first-in/first-out principle may be applied.

This extension of the general method may mirror the treatment of messages to the search terms. Furthermore, the maintenance of the list of search terms may be treated equivalently to the messages. A regular deletion of terms and the search may be performed in parallel to the cleaning process (i.e., deletion) of the messages. A difference may be that in the list of search terms only the oldest ones may be deleted. Therefore, it may be advantageous that a time stamp may also be maintained together with a search term. Hence, the method may be adjustable by parameter values which may control the behavior in respect to the list of search terms.

According to an additionally permissive embodiment of the method, the message may have a message type selected out of the group comprising an email message, an instant message, an automatically generated message, a transcribed voice message. Hence, basically any type of message may be suitable to be treated by the proposed method. It may also be that the automatically generated message may be generated by chat-bot, an IoT device or any other source. Furthermore, the transcribed voice message may originate from any audio channel of a video stream or the like.

According to a preferred embodiment, the method may also comprise maintaining interaction type count values for different types of interactions together with the message. Therefore, different interaction type content values for, e.g., hovering over a message, selecting the message, clicking on the message, extending or editing the message, adding comments or responding to a message, and opening an attachment, or comparable activities can be maintained advantageously. The interaction type count values may be seen as classical meta data to the interaction type count values.

The interaction type counter may be reset (i.e., the value may be deleted resulting in a "0" value)—in particular, dependent on the implementation type of the method—or the interaction type counter may be increased with further interactions of the method. This may have the effect that older, non-deleted messages continue to accumulate weight over time.

Another alternative—which may add a little bit of the principle of randomness into the method—may comprise to multiply the interaction type count values regularly or at predefined times with an index factor x, wherein $0 \leq x \leq 1$. As a consequence, the count values may automatically decrease (i.e., decay) over time. This concept may also be combined with the concept already described.

In accordance with the just mentioned interaction types and according to additional embodiments of the method, the types of interactions may be selected out of the group comprising a hovering over the message list or an indicator of a message, a selection of a message—in particular, "clicking it"—preparing an extension of a message, opening of an attachment of the message, selecting a link incorporated in the message, reformatting or editing the message content, scrolling through a message header, i.e., a subject lines of a list comprising the message header in question—into viewing for reading, answering to the message in question and, a reference to the message via a link. In addition, other types of interactions with a message(s) are possible. E.g., in case of a voice or video message, also listening to or watching the message may be counted as interaction type.

According to another advantageous embodiment of the method, a search term match may be another type of interaction. I.e., a term may be identical or similar here in the message and in the list of search terms. This does not represent a user-driven interaction, but an automatically generated interaction. Such automatically generated interactions may be given different weighing factors for different interaction count values for the respective contests. IN general, a search term match may be handed like any other type of interaction with the message, like selecting the message from a list for reading.

According to a further developed embodiment of the method, the deletion of the messages may be performed at predefined events. These predefined events may be calendar-based (date and time), or regular time intervals or depending on an event, such as a trigger signal, e.g., when a storage amount of the messaging system may have reached a certain threshold (percentage) value. Furthermore, additional conditions may be defined during the configuration of the messaging system in order to trigger a deletion of messages. This may keep the messaging system lean and free of messages which content does not represent a value to the user community.

According to another enhanced embodiment of the method, the deleting of the messages may be limited to a sub-group of all messages. This may be topic-based, based on a selected set of the search terms or according to other conditions. These may include messages which may have been generated, edited or reused in a predefined time window, which may have been generated by a subgroup of users, and so on.

According to a further useful embodiment, the method may also comprise skipping the deletion of a message according to one or more predefined rules. It may be possible to provide a "pinning flag" to a message because it should not be deleted due to regulatory roads and procedures measures, or to keep messages topic-based.

On the other hand, and according to another embodiment, it may also be possible to have a forced deletion process of individual messages or messages belonging to a specific topic, e.g., due to legal requirements for minimum or maximum retention times.

According to another advanced embodiment, the method may comprise skipping the deletion of a message if the message is—e.g., directly—linked to a message comprising a retention score value which may be above a context threshold value. Thus, a topic may be of particular interest in a certain period of time so that no messages should be deleted for a predefined period of time.

According to another permissive embodiment of the method, the context threshold value may be based on a distance—according to a predefined content distance measurement algorithm—to the message comprising the retention score value which is above a context threshold value. Furthermore, other and more advanced distance measurement techniques may be freely defined, e.g., one hop, or n hops away from a message which deletion is skipped. The skipping may also be based on content similarity between messages, relating to same or similar keywords, having the same or a similar relationship to terms in the search term list, and so on.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
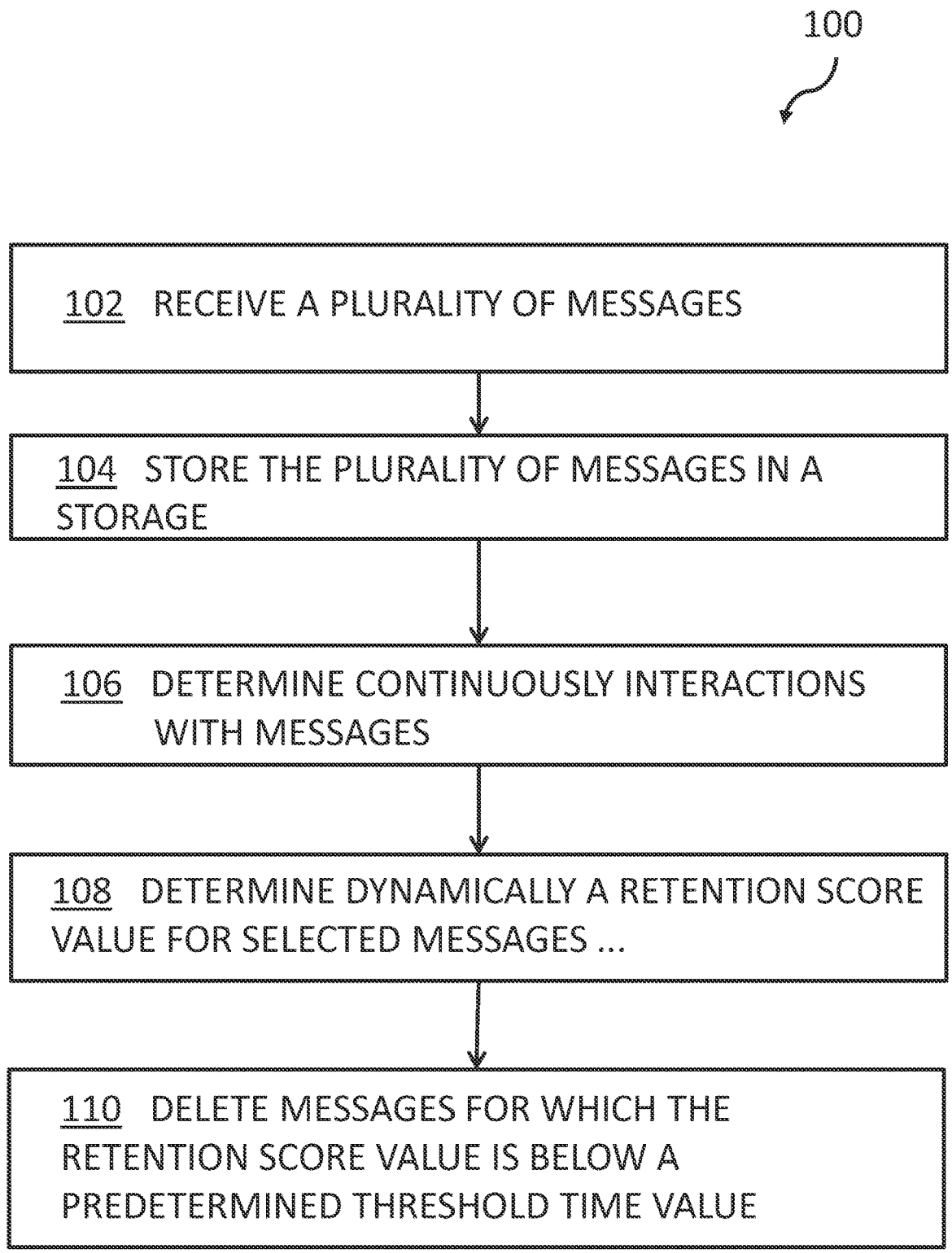

Preferred embodiments of the invention will be described, by way of example only, and with reference to the following drawings:

FIG. 1 shows a block diagram for dynamically adjusting individual message retention times in a messaging system, in accordance with an embodiment of the present invention.

Figure 2:
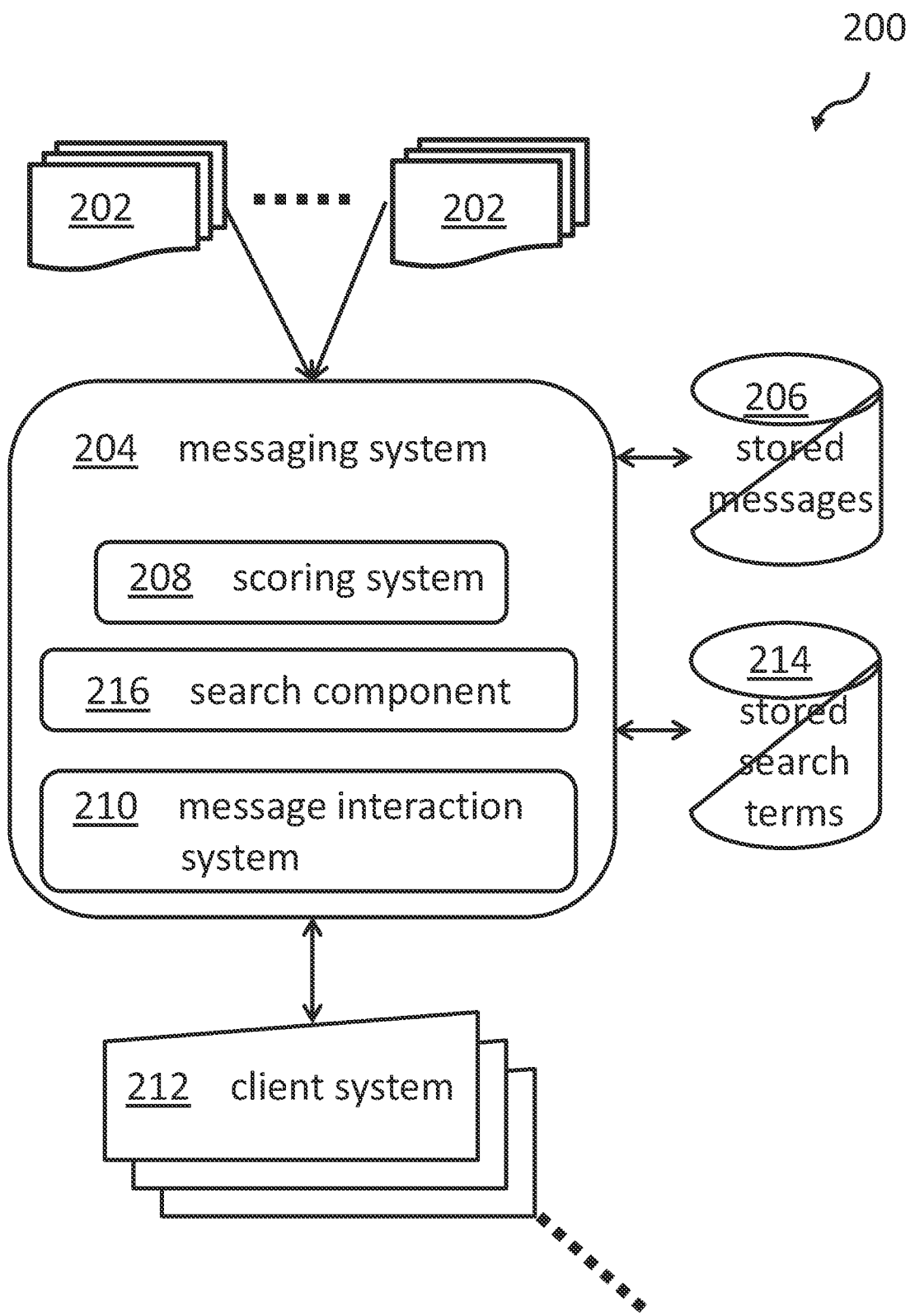

FIG. 2 shows a block diagram of useful components of the messaging system, in accordance with an embodiment of the present invention.

Figure 3:
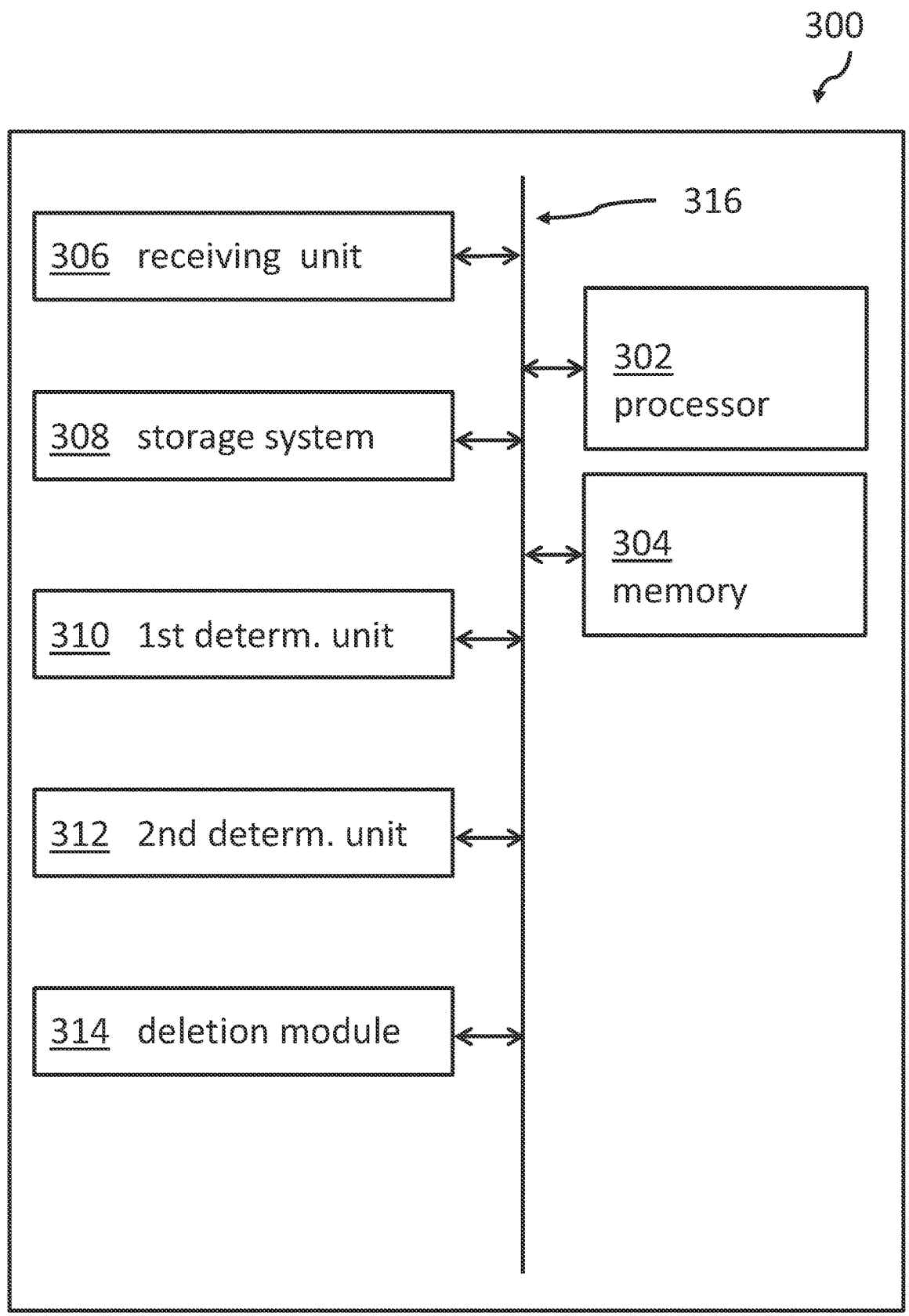

FIG. 3 shows a block diagram an adaptive message retention system for dynamically adjusting individual message retention times, in accordance with an embodiment of the present invention.

Figure 4:
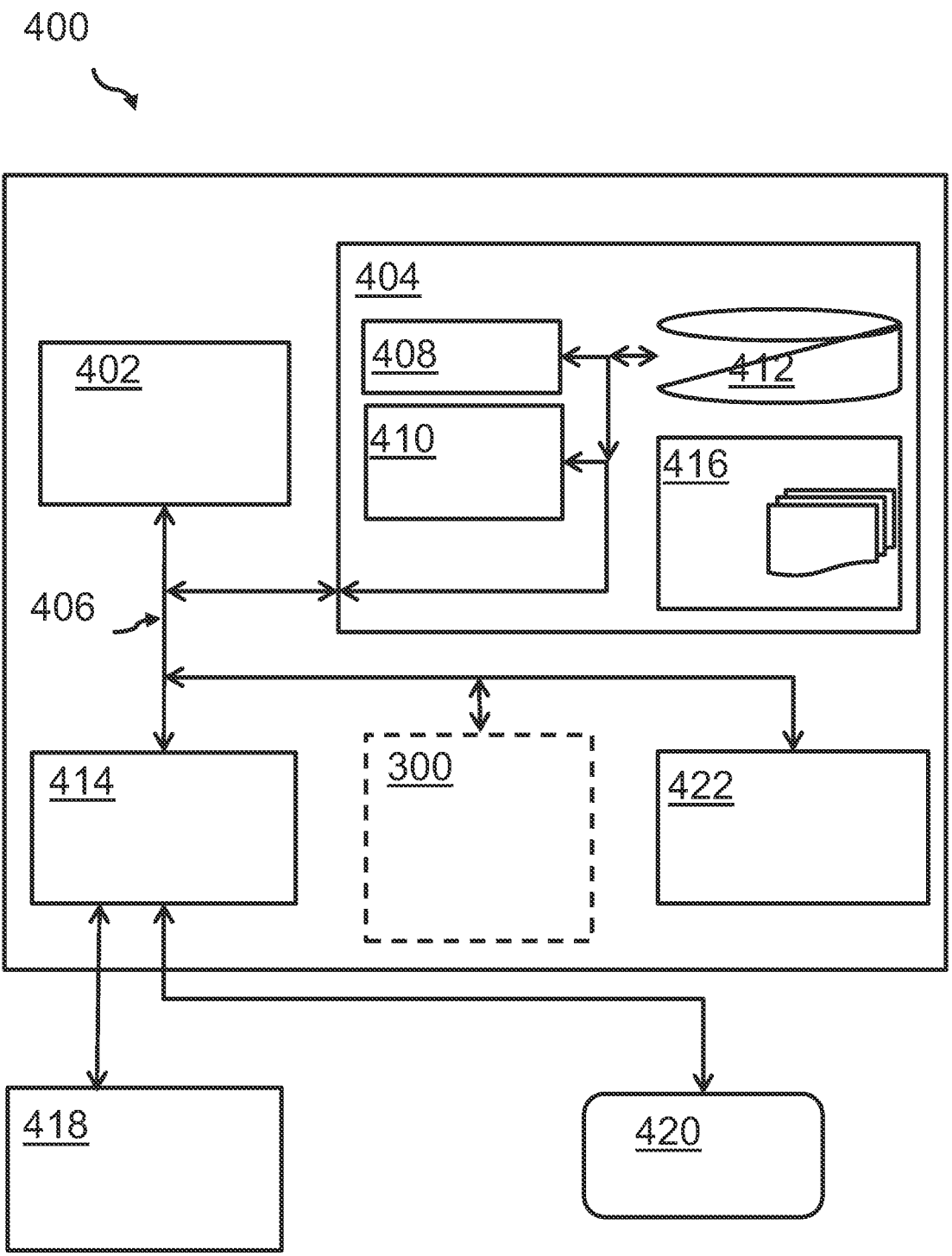

FIG. 4 shows a block diagram of a computing system comprising the system according to FIG. 3, in accordance with an embodiment of the present invention.

Figure 5:
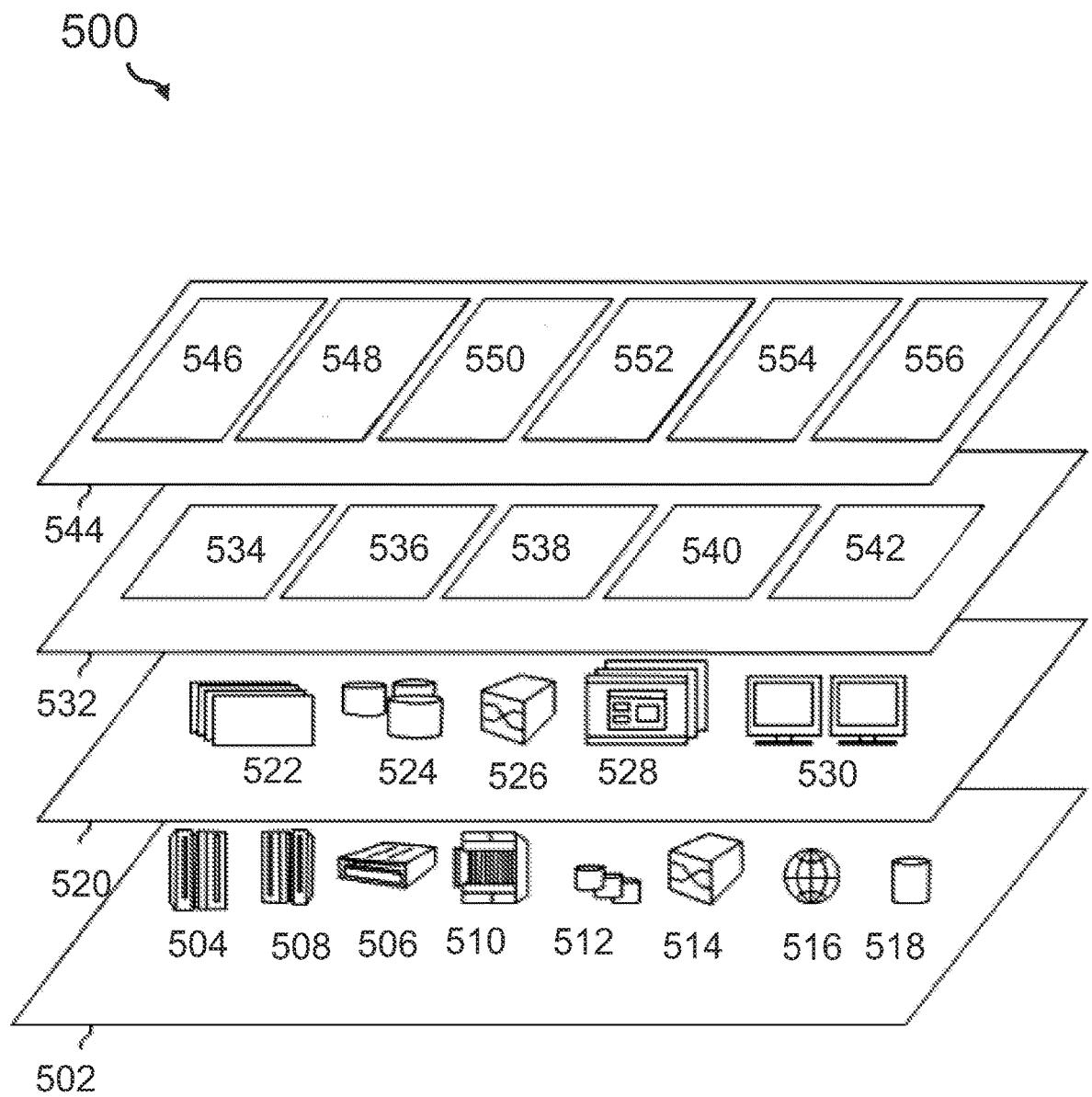

FIG. 5 shows a cloud computing environment in which at least parts of the inventive concept may be deployed, in accordance with an embodiment of the present invention.

Figure 6:
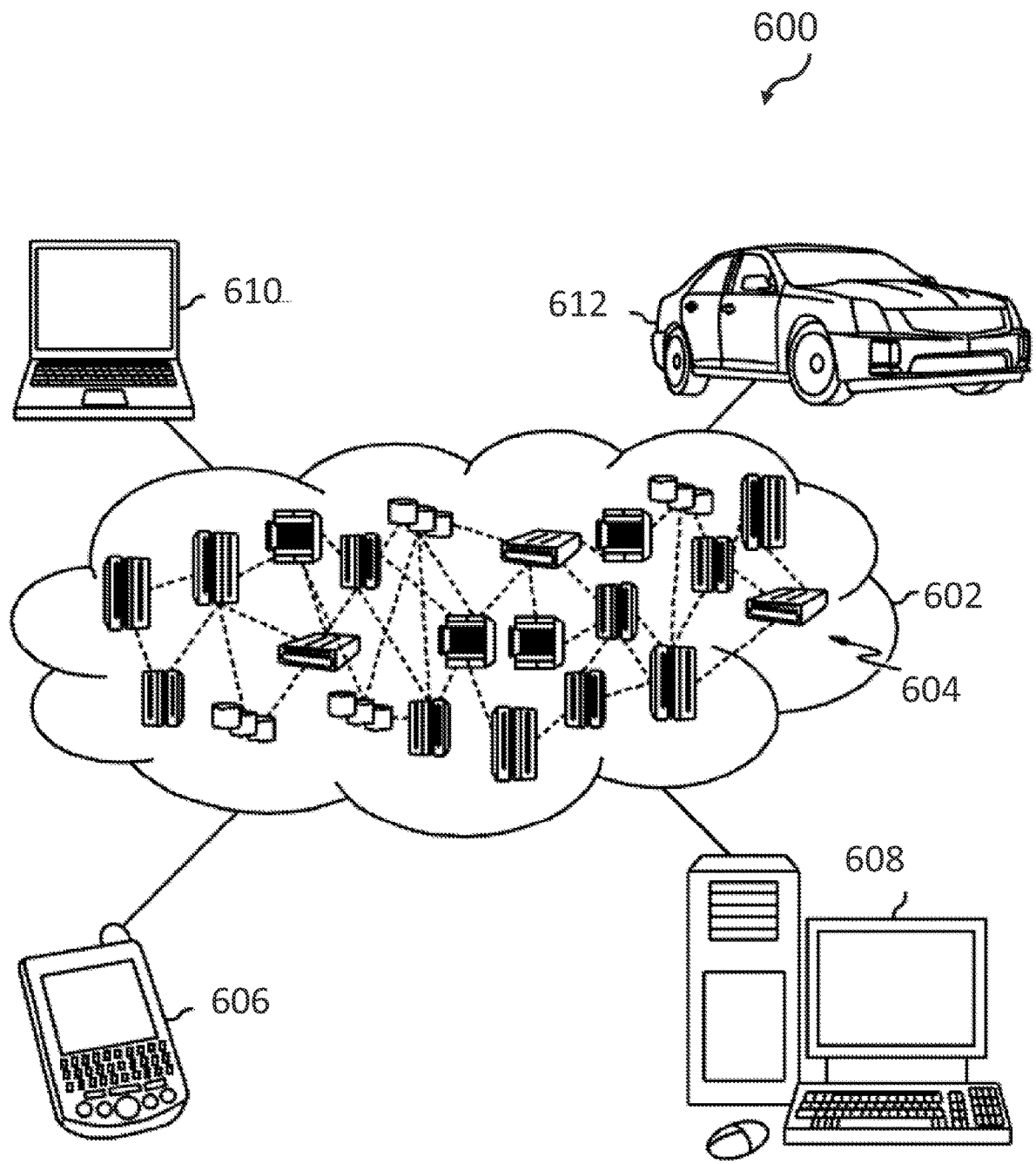

FIG. 6 shows components of a cloud computing environment, in accordance with an embodiment of the present invention.

DETAILED DESCRIPTION

In the context of this description, the following technical conventions, terms and/or expressions may be used:

The term "message retention time" may denote the time a message may be stored before it may be deleted in a messaging system or a storage attached or related to the messaging system.

The term "messaging system" may denote a system enabled to receive, send and store messages. One example may be an email server, a chat server, or similar. Generally, a messaging system is adapted to receive a plurality of messages from a plurality of senders in order to store and or resend the messages (one or more).

The term "message" may denote a plurality of formats in which content may be distributed. This may start with a simple email (with or without an attachment), a chat command, a voice message, a video message or a message from a device, wherein the message may not be formatted in a way to be human readable (e.g., message broker, IoT device, etc.).

The term "interaction"—in particular an interaction with a message—may denote any access or any manipulation of a message. This may comprise readings in the message, editing the message, forwarding the message, resending or redistributing the message, deleting parts of the message and so on. Additionally, the appearance of a term in the message that is also available in a list of search terms may also be treated as interaction.

The term "retention score value" may denote a real or integer value—or a vector—indicative of an importance to continue storing the message or if the retention score value may be below a predefined (or dynamically changing) related threshold value to activate a deletion of the message.

The term "interaction type count value" may denote a value indicative of a type of interaction between the client system and a specific message of a specific type. Hence, such counter may be related to each message. The counter value may also be implemented as a vector in order to reflect different types of interactions. In such case, each element of the vector would reflect one type of interaction.

The term "search score value" may denote a value of one or more determinations whether a message may be found in a list of search terms. The search terms itself may also be related to a search term importance value depending how often a specific search term was searched within the messaging system. Hence, the search score value larger than zero may express that the term within the message has been searched as well as how often the search term itself has been searched. In a practical implementation, each term may have a related counter which may be used as a basis for a weight value. Hence, and as an example, if the combined term "Red Hat" is part of a message and also comprised in the list of search terms, the score value may be increase because "red" has been found and also because "hat" has been found. In case, the combined term has been found—i.e., term being adjacent to each other—an additional score value increase may be triggered.

It should also be mentioned that the search score value may also be one or more elements of the vector mentioned in the paragraph above.

Because the proposed concept may advantageously be deployed in a cloud computing environment, useful terms in such environments may also be defined:

The term "cloud computing"—and equivalently the more specific term 'cloud computing environment'—may in this context be interpreted as a model for enabling convenient, on-demand network access to a shared pool of configurable computing resources (e.g., networks, servers, storage, applications, and services, i.e., collectively denoting execution environments) that can be rapidly provisioned and released with minimal management effort or service provider interaction. This cloud model promotes availability and is composed of at least five essential characteristics, three service models and four deployment models.

Essential characteristics of cloud computing comprise

On-demand self-service. A consumer can unilaterally provision computing capabilities, such as server time and network storage, when needed automatically without requiring human interaction with each service provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing use comprise:

Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating system(s), storage, deployed applications, and possibly limited control of selected networking components (e.g., host firewalls).

Deployment models for cloud computing comprise

Private cloud. The cloud infrastructure is operated solely by an organization. It may be managed by the organization or a third party and may exist on premise or off premise.

Community cloud. The cloud infrastructure is shared by several organizations and supports a specific community that has shared concerns (e.g., mission, security requirements, policy, and compliance considerations). It may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software can take full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive method for dynamically adjusting individual message retention times in a messaging system is given. Afterwards, further embodiments, as well as embodiments of the adaptive message retention system for dynamically adjusting individual message retention times in a messaging system will be described.

FIG. 1 shows a block diagram of a preferred embodiment of the method 100 for dynamically adjusting individual message retention times—i.e., determine when a message should be deleted—in a messaging system. The method comprises receiving, step 102, by the messaging system, a plurality of messages which are receivable from a plurality of client systems. Typically, such client systems are operated by a user. However, the here proposed system may also work for automatically generated messages like those of bots, e.g., chat bots, or IoT (Internet of Things) devices, and the like. The messages can be received by the messaging system via a plurality of logical or physical message channels; and they may be locked in a system log message stream storage.

The method 100 further comprises storing, step 104, by the messaging system, the plurality of messages in a storage system. Such a storage system may be part of the messaging system or may be connected for data exchange and/or otherwise outside but under control of the messaging system. For example, a cloud computing storage may be used. Additionally, also the messaging system itself may be implemented in a cloud computing environment.

Additionally, the method 100 comprises determining, step 106, continuously, by the messaging system, interactions with messages stored by the messaging system. Such interactions may be monitored continuously like, but not limited to, hovering over a subject line or a sender of a message, selecting it, clicking on it, extending it, commenting it, opening attachments, or similar.

Moreover, the method 100 comprises determining, step 108, dynamically, by the messaging system, a retention score value for selected messages based on a sum of weighted interactions type count values of the determined interactions. This may relate to a minimum of only one message, but may also be available for all messages, or selected ones. Specific selection criteria may be applied, like time periods, senders, receivers, other sub-groups, depending on what kind of messages have been sent before (i.e., the message history), and the like. The retention score value may be a result of a function with a plurality of arguments, like the just mentioned once.

Finally, the method 100 comprises deleting, step 110, by the messaging system, messages for which the retention score value is below a predetermined retention threshold value. This represents a self-maintaining system monitoring its own "cleanness" in respect to unused messages. The predefined retention threshold value may be set according to a variety of criteria which may lean on the concept of percentile, i.e., keep only the top 10%, the top 20%, ... 90%, etc.

Consequently, all other messages—in particular those whose retention score value is above the predefined threshold value—will be maintained for further access by the users' systems, i.e., the users.

FIG. 2 shows a block diagram of an embodiment 200 of useful components of the messaging system. A plurality of messages 202 may be received and managed by the messaging system 204. The type of messages 202 can be homogeneous or completely inhomogeneous or have any mix in between. This can reach from simple sensor measurement data (i.e., IoT messages) to video stream messages. As shown, stored messages 206 are stored in a storage system which may directly or remotely be attached to the messaging system 204. Because of limited storage capacity of storage systems (or for other reasons) the amount of messages stored shall not be limitless. Hence, an intelligent self-adapting and dynamic approach for a retention time of the stored messages would be instrumental to achieve the just mentioned objective.

For this, the messaging system comprises a message interaction system 210 which is adapted to capture any interaction with the stored messages. An example of interactions is accessing the message via a client system, 212, e.g., by a user, reading the message by another automation component hoovering over a displayed title of the message with a pointing device, extending the message, editing the message, and so on.

Furthermore, the messaging system 204 can comprise a search component 216 with which client systems 212—in particular, operated by a user—can search for keywords in the stored messages 206. The search component 216 is also enabled to store search terms that have been used for search operations. The search terms may have dedicated search term scores in which the stored search terms 214 are stored.

Alternatively, they may also be stored together with the stored messages 206 in the same storage system. The term or rules for the storage of individual search terms be de definable. Typically, older search terms should be "forgotten" by the system (compare above).

The scoring system 208 is enabled to determine which of the stored messages 206 should be stored or maintained and which stored messages should no longer be maintained, i.e., deleted or discarded. Thereby, the scoring system 208 takes into account interactions of the client systems 212 with the stored messages 206 and also found search terms that have been used in the past. As a result, more common used search terms may have a higher weight or score value which may also affect the scoring of the stored messages 206 and the process of determining which message to delete.

The deletion of parts of the stored messages may be activated at regular time intervals or driven by an event, e.g., when the message store is filled up to a predefined percentage.

FIG. 3 shows another block diagram of an embodiment of the adaptive message retention system 300 for dynamically adjusting individual message retention times in a messaging system. The system 300 comprises a processor 302 and a memory 304, communicatively coupled to the processor 302, wherein the memory 304 stores program code portions that when executed, enable the processor, to receive—in particular by a receiving unit 306—a plurality of messages, to store the plurality of messages in a storage or e.g., the storage system 308, and to determine continuously—in particular, by a first determination unit 310 of the message retention system 300 which may be a part of an underlying messaging system—interactions with messages stored by the messaging system 300.

Furthermore, the processor 302 is further adapted to determine dynamically—in particular by a second determination unit 312 of the message retention system 300 of related messaging system—a retention score value for selected messages based on a sum of weighted interactions type count values of the determined interactions, and to delete—in particular, by a deletion module 314—messages for which the retention score value is below a predetermined retention threshold value.

It shall also be mentioned that all functional units, modules and functional blocks—in particular the processor 302, memory 304, the receiving unit 306, the storage system 308, the first determination unit 310, the second determination unit 312 and the deletion module 314—may be communicatively coupled to each other for signal or message exchange in a selected 1:1 manner. Alternatively the functional units, modules and functional blocks can be linked to a system internal bus system 316 for a selective signal or message exchange.

Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system, and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. Program modules 416 generally carry out the functions and/or methodologies of embodiments of the invention, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of the computer system/server 400 via bus 406. It should be understood that, although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, the adaptive message retention system 300 for dynamically adjusting individual message retention times in a messaging system may be attached to the bus 406 (also referenced as bus system 406).

FIG. 5 shows a cloud computing environment 500 in which at least parts of the inventive concept may be deployed. A set of functional abstraction layers provided by a cloud computing environment is shown. It should be understood in advance that the components, layers, and functions, shown in FIG. 5, are intended to be illustrative only, and embodiments of the invention are not limited thereto. As depicted, the following layers and corresponding functions are provided: Hardware and software layer 502 include hardware and software components. Examples of hardware components include: mainframes 504; servers 506; RISC (Reduced Instruction Set Computer) architecture based servers 508; blade servers 510; storage devices 512; networks 514 and networking components thereof. In some embodiments, software components include network application server software 516 and/or database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530. In one example, management layer 532 may provide the functions described below. Resource provisioning 534 provides dynamic procurement of computing resources and other resources that are utilized to perform tasks within the cloud computing environment. Metering and pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provides pre-arrangement for, and procurement of, cloud computing resources for which a future requirement is anticipated in accordance with an SLA.

Workload layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and the adaptive message retention system 556 for dynamically adjusting individual message retention times in a messaging system (compare also FIG. 3, 300).

FIG. 6 shows components 600 of a cloud computing environment 602. As shown, cloud computing environment 602 comprises one or more cloud computing nodes 604 (also referenced as nodes 604) with which local computing devices used by cloud consumers, such as, for example, personal digital assistant (PDA) or cellular telephone 606, desktop computer 608, laptop computer 610, and/or automobile computer system 612 may communicate. Nodes 604 may communicate with one another. They may be grouped (not shown) physically or virtually, in one or more networks, such as Private, Community, Public, or Hybrid clouds as described hereinabove, or a combination thereof. This allows cloud computing environment 602 to offer infrastructure, platforms and/or software as services for which a cloud consumer does not need to maintain resources on a local computing device. It is understood that the types of computing devices 604 shown in FIG. 6 are intended to be illustrative only and that computing nodes 10 and cloud computing environment 602 can communicate with any type of computerized device over any type of network and/or network addressable connection (e.g., using a web browser).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium(or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following : a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider),In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In summary, the inventive concept may be summarized by the following clauses:

1. A computer-implemented method for dynamically adjusting individual message retention times in a messaging system, the method comprising:
   receiving, by the messaging system, a plurality of messages,
   storing, by the messaging system, the plurality of messages in a storage,
   determining continuously, by the messaging system, interactions with messages stored by the messaging system,
   determining dynamically, by the messaging system, a retention score value for selected messages based on a sum of weighted interactions type count values of the determined interactions, and
   deleting, by the messaging system, messages for which the retention score value is below a predetermined retention threshold value.
2. The method according to clause 1, further comprising:
   maintaining, by the messaging system, a list of search terms used in the messaging system, and
   determining, by the messaging system, whether one or more search terms of the list of search terms is found in a stored message, thereby building a search score value for the message, wherein the determining the retention score value is also based on the search score value.
3. The method according to clause 1 or 2, wherein the message has a message type selected out of the group comprising an email message, an instant message, an automatically generated message, a transcribed voice message.
4. The method according to any of the preceding clauses, also comprising:
   maintaining interaction type count values for different types of interactions with the message.
5. The method according to clause 4, wherein the types of interactions are selected out of the group comprising a hovering over an indicator of a message, a selection of a message, an extension of a message, an opening of an attachment of the message, a selection of a link incorporated in the message, a reformatting of content of the message content, a scrolling a message header into view for reading, an answer to the message and, a reference to the message via a link.
6. The method according to clause 4, wherein one type of interaction is a search term match.
7. The method according to any of the preceding clauses, wherein the deleting of the messages is performed at predefined events.
8. The method according to any of the preceding clauses, wherein the deleting of the messages is limited to a sub-group of the messages.
9. The method according to any of the preceding clauses, also comprising:

skipping the deletion of a message according to predefined rules.
10. The method according to any of the preceding clauses, also comprising:
skipping the deletion of a message if the message is linked to a message comprising a retention score value which is above a context threshold value.
11. The method according to any of the preceding clauses, wherein the context threshold value is based on a distance to the message comprising the retention score value which is above a context threshold value.
12. An adaptive message retention system for dynamically adjusting individual message retention times in a messaging system, the system comprising:
a processor and a memory, communicatively coupled to said processor, wherein said memory stores program code portions that when executed, enable said processor, to:
receive a plurality of messages,
store the plurality of messages in a storage,
determine continuously, by the messaging system, interactions with messages stored by the messaging system,
determine dynamically a retention score value for selected messages based on a sum of weighted interactions type count values of the determined interactions, and
delete messages for which the retention score value is below a predetermined retention threshold value.
13. The system according to clause 12, wherein the processor is further enabled to:
maintain a list of search terms used in the messaging system, and
determine whether one or more search terms of the list of search terms is found in a stored message, thereby building a search score value for the message, wherein the determining the retention score value is also based on the search score value.
14. The system according to clause 12 or 13, wherein the message has a message type selected out of the group comprising an email message, an instant message, an automatically generated message, a transcribed voice message.
15. The system according to any of the clauses 12 to 14, wherein the processor is further enabled to:
maintain interaction type count values for different types of interactions with the message.
16. The system according to clause 15, wherein the types of interactions are selected out of the group comprising a hovering over an indicator of a message, a selection of a message, an extension of a message, an opening of an attachment of the message, a selection of a link incorporated in the message, a reformatting of content of the message content, a scrolling a message header into view for reading, an answer to the message and, a reference to the message via a link.
17. The system according to clause 15, wherein one type of interaction is a search term match.
18. The system according to any of the clauses 12 to 17, also comprising:
skipping the deletion of a message according to predefined rules.
19. The system according to any of the clauses 12 to 18, wherein the processor is further enabled to:
skip the deletion of a message if the message is linked to a message comprising a retention score value which is above a context threshold value.
20. A computer program product for dynamically adjusting individual message retention times in a messaging system, the computer program product comprising a computer readable storage medium having program instructions embodied therewith, the program instructions being executable by one or more computing systems or controllers to cause the one or more computing systems to:
receive a plurality of messages,
store the plurality of messages in a storage,
determine continuously interactions with messages stored by the messaging system,
determine dynamically a retention score value for selected messages based on a sum of weighted interactions type count values of the determined interactions, and
delete messages for which the retention score value is below a predetermined retention threshold value.

What is claimed is:

1. A computer-implemented method comprising:
dynamically adjusting individual message retention times in a messaging system to manage storage resources for the message system, wherein dynamically adjusting individual message retention times comprise:
receiving, by the messaging system, a plurality of messages;
storing, by the messaging system, the plurality of messages in a storage,
determining continuously, by the messaging system, interactions with messages stored by the messaging system,
determining dynamically, by the messaging system, a retention score value for selected messages based on a sum of weighted interactions type count values of the determined interactions and a weighted search score value for respective messages of the selected messages, wherein the weighted search score value is determined based on commonalities of search terms in the selected messages, and
deleting, by the messaging system, messages for which the retention score value is below a predetermined retention threshold value to save storage in the message system.

2. The computer-implemented method of claim 1, further comprising:
maintaining, by the messaging system, a list of search terms used in the messaging system, and
determining, by the messaging system, whether one or more search terms of the list of search terms is found in a stored message, thereby building a search score value for a message of the plurality of messages, and wherein the determining the retention score value is also based on the search score value.

3. The computer-implemented method of claim 1, wherein a message of the plurality of messages has a message type selected out of the group comprising an email message, an instant message, an automatically generated message, a transcribed voice message.

4. The computer-implemented method of to claim 1, further comprising:
maintaining interaction type count values for different types of interactions with the message.

5. The computer-implemented method of claim 4, wherein the different types of interactions are selected out of the group comprising: a hovering over an indicator of a message, a selection of a message, an extension of a message, an opening of an attachment of the message, a selection of a link incorporated in the message, a reformatting of content of the message content, a scrolling a message header into view for reading, an answer to the message and, a reference to the message via a link.

6. The computer-implemented method of claim 4, wherein one type of interaction is a search term match.

7. The computer-implemented method of claim 1, wherein the deleting of the messages for which the retention score value is below a predetermined retention threshold value is performed at predefined events.

8. The computer-implemented method of claim 1, wherein the deleting of the messages is limited to a subgroup of the messages.

9. The computer-implemented method of claim 1, further comprising:
skipping the deletion of a message according to predefined rules.

10. The computer-implemented method of claim 1, further comprising:
skipping the deletion of a message if the message is linked to a message comprising a retention score value which is above a context threshold value, wherein the context threshold value is based on a distance to the message comprising the retention score value which is above a context threshold value.

11. A computer system comprising:
one or more computer processors;
one or more computer readable storage media; and
program instructions stored on the one or more computer readable storage media for execution by at least one of the one or more computer processors, the program instructions comprising:
program instructions to dynamically adjust individual message retention times in a messaging system to manage storage resources for the message system, wherein the program instructions to dynamically adjust individual message retention times comprise:
program instructions to receive a plurality of messages;
program instructions to store the plurality of messages in a storage;
program instructions to determine continuously interactions with messages stored by the messaging system;
program instructions to determine dynamically a retention score value for selected messages based on a sum of weighted interactions type count values of the determined interactions and a weighted search score value for respective messages of the selected messages, wherein the weighted search score value is determined based on commonalities of search terms in the selected messages, and
program instructions to delete messages for which the retention score value is below a predetermined retention threshold value to save storage in the message system.

12. The computer system of claim 11, wherein the program instructions stored on the one or more computer readable storage media further comprise:
program instructions to maintain a list of search terms used in the messaging system, and
program instructions to determine whether one or more search terms of the list of search terms is found in a stored message, thereby building a search score value for a message of the plurality of messages, and wherein the determining the retention score value is also based on the search score value.

13. The computer system of claim 11, wherein a message of the plurality of messages has a message type selected out of the group comprising an email message, an instant message, an automatically generated message, a transcribed voice message.

14. The computer system of claim 11, wherein the program instructions stored on the one or more computer readable storage media further comprise:
program instructions to maintain interaction type count values for different types of interactions with the message.

15. The computer system of claim 14, wherein the types of interactions are selected out of the group comprising a hovering over an indicator of a message, a selection of a message, an extension of a message, an opening of an attachment of the message, a selection of a link incorporated in the message, a reformatting of content of the message content, a scrolling a message header into view for reading, an answer to the message and, a reference to the message via a link.

16. The computer system of claim 14, wherein one type of interaction is a search term match.

17. The computer system according to claim 11, wherein the program instructions stored on the one or more computer readable storage media further comprise:
program instructions to skip the deletion of a message for which the retention score value is below a predetermined retention threshold value according to predefined rules.

18. The computer system of claim 11, wherein the program instructions stored on the one or more computer readable storage media further comprise:
program instructions to skip the deletion of a message if the message is linked to a message comprising a retention score value which is above a context threshold value.

19. A computer program product comprising:
one or more computer readable storage media and program instructions stored on the one or more computer readable storage media, the program instructions comprising:
program instructions to dynamically adjust individual message retention times in a messaging system to manage storage resources for the message system, wherein the program instructions to dynamically adjust individual message retention times comprise:
program instructions to receive a plurality of messages;
program instructions to store the plurality of messages in a storage;
program instructions to determine continuously interactions with messages stored by the messaging system;
program instructions to determine dynamically a retention score value for selected messages based on a sum of weighted interactions type count values of the determined interactions and a weighted search score value for respective messages of the selected messages, wherein the weighted search score value is determined based on commonalities of search terms in the selected messages, and program instructions to delete messages for which the retention score value is below a predetermined retention threshold value to save storage in the message system.

* * * * *